3,557,036
HEAT-CURABLE EPOXIDE RESIN MIXTURES
Rolf Schmid, Reinach, Friedrich Lohse, Allschwil, Willy Fisch, Binningen, and Hans Batzer, Arlesheim, Switzerland, assignors to Ciba Limited, Basel, Switzerland, a company of Switzerland
No Drawing. Filed June 30, 1969, Ser. No. 837,889
Claims priority, application Switzerland, July 24, 1968, 11,091/68
Int. Cl. C08g *17/18, 30/12*
U.S. Cl. 260—22                                                                    17 Claims

ABSTRACT OF THE DISCLOSURE

Heat-curable epoxide resin mixtures of (1) a cycloaliphatic polyepoxide compound which possesses at least one 1,2-epoxide group located on a carbocyclic five-membered or six-membered ring, (2) a polycarboxylic acid anhydride (0.2–1.1 anhydride groups per 1 equivalent of epoxide groups) and (3) a polyester containing terminal carboxyl and/or hydroxyl groups which is obtained by esterification of aliphatic-cycloaliphatic higher dicarboxylic acids (manufactured by dimerization of unsaturated monomeric fatty acid having 14–24 carbon atoms in the molecule, preferably 16–18, and optionally subsequent hydrogenation of such a dimeric fatty acid) with aliphatic diols (0.02–0.4 mol of polyester per 1 equivalent of epoxide groups). The curing of the mixtures yields flexible, impact-resistant mouldings, the mechanical properties of which are largely temperature-independent.

---

It is known that polyepoxide compounds can be cured with carboxylic acid anhydrides to give moulded materials which are distinguished by high mechanical strength, heat resistance, and dielectric strength. For many instances of applications the relatively low flexibility of such moulded materials however proves inadequate. It is known that the flexibility can be increased by addition of plasticisers such as polyethylene glycol, polypropylene glycol or polyesters having terminal carboxyl and/or hydroxyl groups. Cured products which in part have significantly higher deflection and elongation at break are obtained in this manner. These known flexible moulded materials however suffer from some serious disadvantages: the mechanical and dielectric values are very poor. The values already decline rapidly if the temperature rises slightly, and in a moist atmosphere the mouldings rapidly absorb major amounts of water even at room temperature, whereby the dielectric properties are also worsened; even the moulded materials which are still very flexible at room temperature rapidly show a severe embrittlement at lower temperatures.

It is further known from Swiss Pat. No. 441,752 to obtain mouldings of relatively good dielectric properties by reaction of acid polyesters from dimerized fatty acid and ε-caprolactone with epoxide resins. The physical properties of the formulations mentioned, and especially the mechanical strength values of such mouldings, are however still very temperature-dependent. At slightly elevated temperature, and in most cases even at room temperature, the mouldings produced have very low mechanical strength.

It has now been found that flexible impact-resistant mouldings which surprisingly do not show the above-mentioned disadvantages of the hitherto known flexible moulded materials, or show them to a greatly reduced extent, are obtained by reaction of certain cycloaliphatic polyepoxides with polyesters of special structure derived from dimerized fatty acids and with polycarboxylic acid anhydrides, preferably carbocyclic carboxylic acid anhydrides, in certain stoichiometric quantity ratios; in particular, the mechanical properties of the new moulded materials are largely temperature-independent. As is particlarly shown by the measurements of the modulus of shear at various temperatures according to DIN 53,445, the mechanical strength and the resistance of the new moulded materials towards deformations remains preserved up to temperatures of above 140° C. Nevertheless the mouldings still possess good flexibility and impact strength at temperatures below 0° C. The mouldings according to the invention are distinguished by low water absorption as well as by excellent dielectric properties even at elevated temperature and after storage in water. Both the harder and the softer mouldings shown elastic behaviour and possess a pronounced high recoil force and show only slight damping and practically no permanent deformation. This opens up entirely new prospects for the technical use of these new plasticized epoxide resin mixtures, especially in the field of casting, impregnating and laminating resins, adhesives and compression moulding compositions.

The polyesters used for the new curable mixtures and derived from dimerized fatty acids must fulfil very particular structural prerequisites.

Further, 0.02 to 0.4, preferably 0.03 to 0.2, mol of the polyester as well as 0.2 to 1.1 equivalents of anhydride groups of the dicarboxylic and/or polycarboxylic acid anhydrides used as curing agents are employed per 1 epoxide equivalent of the polyepoxide compound in the new curable mixtures.

The subject of the present invention is thus heat-curable plasticized epoxide resin mixtures which are suitable for use as casting, impregnating and laminating resins, as adhesives and as compression moulding compositions, characterised in that they contain (1) a cycloaliphatic polyepoxide compound which possesses at least one 1,2-epoxide group located on a carbocyclic five-membered or six-membered ring, (2) a polycarboxylic acid anhydride in an amount of 0.2 to 1.1 equivalents of anhydride groups per 1 equivalent of epoxide groups of the polyepoxide compound (1) and (3) a long-chain polyester of formula $$X_1-A-X_2 \qquad (I)$$

in an amount of 0.02 to 0.4, preferably 0.03 to 0.2, mol per 1 equivalent of epoxide group of the polyepoxide compound (1), with $X_1$ and $X_2$ in the formula each denoting a carboxyl group or a hydroxyl group, and with A denoting the residue of a polyester which has been obtained by polycondensation of an unsaturated or saturated aliphatic-cycloaliphatic higher dicarboxylic acid, which was manufactured by dimerization of unsaturated monomeric fatty acid having 14 to 24 carbon atoms in the molecule, preferably 16 to 18 carbon atoms, and optional subsequent hydrogenation of such a dimeric fatty acid, with an aliphatic branched-chain or straight-chain diol, with the proviso that the average molecular weight of the polyester lies between about 1100 and about 8000.

The cycloaliphatic polyepoxide compounds used for the manufacture of the new curable mixtures are preferably those particular types which when cured alone with polycarboxylic acid anhydrides such as phthalic anhydride or hexahydrophthalic anhydride, yield moulded materials having a heat distortion point according to Martens DIN 53,458 of at least 90° C. and preferably of at least 140° C.

The use, which is here not claimed, of aromatic polyepoxide compounds such as the diglycidyl compounds of bisphenol A ("diomethane") admittedly also yields products of high flexibility, good dielectric properties and low water absorption. These diglycidyl compounds are however mostly incompatible with the polyesters mentioned (demixing) and the mechanical strength values of the mouldings decline more rapidly as the temperature rises. The good temperature resistance is also markedly lowered on using aliphatic linear polycarboxylic acid anhydrides as curing agents.

As cycloaliphatic polyepoxide compounds possessing at least one six-membered ring to which a 1,2-epoxide group is bonded there may be mentioned:

Limonene diepoxide, vinylcyclohexene diepoxide, cyclohexadiene diepoxide; bis(3,4-epoxycyclohexyl)dimethylmethane.

Epoxycyclohexylmethyl-ethers of glycols or hydroxyalkylene glycols, such as diethylene glycol-bis(3,4-epoxy-6-methyl-cyclohexyl-methyl)ether;
ethylene glycol-bis(3,4-epoxycyclohexylmethyl)ether;
1,4-butanediol-bis(3',4'-epoxycyclohexylmethyl)ether;
(3,4-epoxycyclohexylmethyl)glycidyl-ether;
(3,4-epoxycyclohexyl)glycidyl-ether;
ethylene glycol-bis(3,4-epoxycyclohexyl)ether;
1,4-butanediol-bis(3',4'-epoxycyclohexyl)ether;
p-hydroxyphenyl-dimethylmethane-bis(3,4-epoxycyclohexyl)ether;
bis(3,4-epoxycyclohexyl)ether;
(3',4'-epoxycyclohexylmethyl)-3,4-epoxycyclohexyl-ether;
3,4-epoxycyclohexane-1,1-dimethanol-diglycidyl-ether.

Epoxycyclohexane-1,2-dicarboximides, such as N,N'-ethylenediamine - bis(4,5-epoxycyclohexane-1,2-dicarboximide); epoxycyclohexylmethyl-carbamates such as bis-(3,4-epoxycyclohexylmethyl)-1,3-toluylene-dicarbamate.

Epoxycyclohexanecarboxylates of aliphatic polyols, such as 3-methyl-1,5-pentanediol-bis(3,4-epoxycyclohexane-carboxylate);
1,5-pentanediol-bis(3,4-epoxycyclohexanecarboxylate);
ethylene glycol-bis(3,4-epoxycyclohexanecarboxylate);
2,2-diethyl-1,3propanediol-bis(3',4'-epoxycyclohexane-carboxylate);
1,6-hexanediol-bis(3',4'-epoxycyclohexanecarboxylate);
2-butene-1,4-diol-bis(3',4'-epoxycyclohexanecarboxylate);
2-butene-1,4-diol-bis(3',4'-epoxy-6'-methylcyclohexane-carboxylate);
1,1,1-trimethylolpropane-tris-(3',4'-epoxycyclohexane-carboxylate);
1,2,3-propanetriol-tris(3',4'-epoxycyclohexane-carboxylate);

epoxycyclohexanecarboxylates of hydroxyalkylene glycols, such as diethylene glycol-bis(3,4-epoxy-6-methylcyclohexane-carboxylate), and triethylene glycol-bis(3,4-epoxycyclohexanecarboxylate).

Epoxycyclohexylalkyl-dicarboxylic acid esters, such as bis(3,4-epoxycyclohexylmethyl)maleate;
bis(3,4-epoxycyclohexylmethyl)oxalate;
bis(3,4-epoxycyclohexylmethyl)pimelate;
bis(3,4-epoxy-6-methylcyclohexylmethyl)succinate;
bis(3,4-epoxycyclohexylmethyl)adipate;
bis(3,4-epoxy-6-methylcyclohexylmethyl)adipate;
bis(3,4-epoxy-6-methylcyclohexylmethyl)sebacate;
bis(3,4-epoxycyclohexylmethyl)terephthalate; and
bis(3,4-epoxy-6-methylcyclohexylmethyl)terephthalate.

Epoxycyclohexyl-carboxylic acid esters such as bis(3,4-epoxycyclohexyl)succinate;
bis(3,4-epoxycyclohexyl)adipate;
bis(3,4-epoxycyclohexyl)carbonate;
(3',4'-epoxycyclohexyl)-3,4-epoxycyclohexane-carboxylate;
3',4'-epoxycyclohexylmethyl-9,10-epoxystearate;
2',2''-sulphonyldiethanol-bis(3,4-epoxycyclohexane-carboxylate);
and bis (3,4-epoxycyclohexylmethyl)-carbonate.

Further, there may especially be mentioned the 3,4-epoxycyclohexanecarboxylates of 3,4-epoxycyclohexyl-methanols, such as for example 3',4'-epoxy-2'-methylcyclohexylmethyl)-3,4-epoxy-2-methylcyclohexanecarboxylate;
(1'-chlor-3',4'-epoxycyclohexyl)-1-chlor-3,4-epoxycyclohexanecarboxylate;
(1'-brom-3',4'-epoxycyclohexylmethyl)-1-brom-3,4-epoxycyclohexanecarboxylate;

and amongst those which are particularly suitable for example those of formulae:

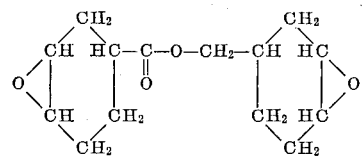

(=3',4'-epoxycyclohexylmethyl-3,4-epoxycyclohexane-carboxylate) and

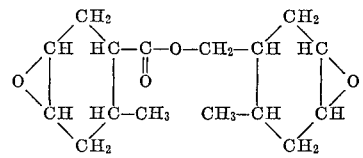

(=3',4'-epoxy-6'-methylcyclohexylmethyl-3,4-epoxy-6-methylcyclohexanecarboxylate).

Acetals and ketals having epoxycyclohexane groups such as bis(3,4-epoxy-6-methylcyclohexylmethyl)carbonate;
3,4-epoxy-6-methyl-cyclohexanecarboxaldehyde-bis(3,4-epoxy-6-methylcyclohexylmethyl)acetal;
bis(3,4-epoxycyclohexylmethyl)formal;
bis(3,4-epoxy-6-methylcyclohexylmethyl)formal;
benzaldehyde-bis(3,4-epoxycyclohexylmethyl)acetal;
acetaldehyde-bis(3,4-epoxycyclohexylmethyl)acetal;
acetone-bis-(3,4-epoxycyclohexylmethyl)ketal;
glyoxal-tetrakis(3,4-epoxycyclohexylmethyl)acetal;
bis(3,4-epoxyhexahydrobenzal)-D-sorbitol;
bis(3,4-epoxyhexahydrobenzal)pentaerythritol(=3,9-bis(3,4-epoxycyclohexyl)spirobi(metadioxane));
bis(3,4-epoxy-6-methylhexahydrobenzal)pentaerythritol;
3-(3'-4'-epoxycyclohexylmethyl-oxyethyl)-2,4-dioxaspiro(5.5)-8,9-epoxyundecane;
3-(3'-4'-epoxycyclohexylmethyloxy-(2')-propyl)-2,4-dioxaspiro(5.5)-8,9-epoxyundecane;
3,9-bis(3'-4'-epoxycyclohexylmethyloxyethyl)spirobi(m-dioxane);
3-(2'-3'-epoxypropyloxyethyl)-2,4-dioxaspiro(5.5)8,9-epoxyundecane;
ethylene glycol-bis-2'(2,4-dioxaspiro(5.5)-8,9-epoxyundecyl-3)ethyl-ether;
polyethylene glycol-bis-2'(2,4-dioxaspiro-(5.5)-8,9-epoxyundecyl-3)ethyl-ether;
1,4-butanediol-bis-2'(2,4-dioxaspiro(5.5)-8,9-epoxyundecyl-3)ethyl-ether;
transquinitol-bis-2'(2,4-dioxaspiro(5.5)-8,9-epoxyundecyl-3)ethyl-ether;
bis(2,4-dioxaspiro(5.5)-8,9-epoxyundecyl-3)ether;
3,4-epoxyhexahydrobenzaldehyde(1'-glycidyloxyglycerine-2',3')-acetal and, amongst those which are particularly suitable, for example those of formulae:

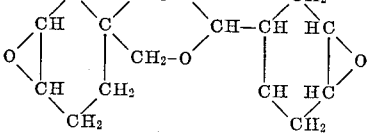

(3-(3',4'-epoxycyclohexyl)-8,9-epoxy-2,4-dioxaspiro-[5.5]-undecane) and of formula

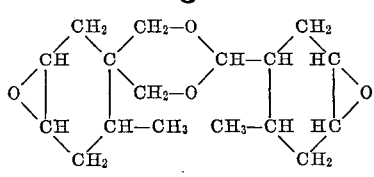

(3-(3',4'-epoxy-6'-methylcyclohexyl)-8,9-epoxy-11-methyl-2,4-dioxaspiro[5.5]undecane).

As cycloaliphatic polyepoxide compounds having at least one five-membered ring to which a 1,2-epoxide group is bonded there may be mentioned:

dicyclopentadiene diepoxide;
glycidyl-2,3-epoxycyclopentyl-ether;
bis(cyclopentenyl)ether diepoxide;
2,3-epoxybutyl-2,3-epoxycyclopentyl-ether;
epoxypentyl-2,3-epoxycyclopentyl-ether;
9,10-epoxystearyl-2,3-cyclopentyl-ether;
3,4-epoxycyclohexymethyl-2,3-cyclopentyl-ether;
2,2,5,5-tetramethyl-3,4-epoxycyclohexylmethyl-2,3-cyclopentyl-ether;
2,2,5,5,6-pentamethyl-3,4-epoxycyclohexylmethyl-2,3-epoxycyclopentyl-ether;
2,3-epoxycyclopentyl-9,10-epoxy-stearate;
2,3-epoxycyclopentyl-3,4-epoxycyclohexycarboxylate;
2,3-epoxycyclopentyl-2,2,5,5-tetramethyl-3,4-epoxycyclohexylcarboxylate;
(3',4'-epoxy-2',5'-endomethylene-cyclohexylmethyl)-3,4-epoxy-2,5-endomethylene-cyclohexanecarboxylate;
bis(3,4-epoxy-2,5-endomethylene-cyclohexylmethyl) succinate;
bis(3,4-epoxy-2,5-endomethylene-cyclohexylmethyl) formal;
bis(3,4-epoxy-2,5-endomethylene-hexahydrobenzal) pentaerythritol;
3-(3',4'-epoxy-2',5'-endomethylene-cyclohexylmethyl)-9,10-epoxy-2,4-dioxaspiro(5.5)undecane;
bis(3-oxatricyclo[3.2.1.0$^{2,4}$]-oct-6-yl)carbonate;
bis(3-oxatricyclo[3.2.1.0$^{2,4}$]-oct-6-yl)succinate;
(3-oxatricyclo[3.2.1.0$^{2,4}$]-oct-6-yl)-3,4-epoxycyclohexylcarboxylate;
(3-oxatricyclo[3.2.1.0$^{2,4}$]-oct-6-yl)-9,10-epoxy-octadecanoate;

further, especially, epoxidized ethers and esters of dihydrodicyclopentadien-8-ol, such as (4-oxatetracyclo[6.2.1.0$^{2,7}$0$^{3,5}$]hendec-9-yl)glycidyl-ether;
(4-oxatetracyclo[6.2.1.0$^{2,7}$0$^{3,5}$]hendec-9-yl)-2,3-epoxybutyl-ether;
(4-oxatetracyclo[6.2.1.0$^{2,7}$0$^{3,5}$]hendec-9-yl)-6-methyl-3,4-epoxycyclohexylmethyl-ether;
(4-oxatetracyclo[6.2.1.0$^{2,7}$0$^{3,5}$]-hendec-9-yl)-3,4-epoxycyclohexyl-ether;
(4-oxatetracyclo[6.2.1.0$^{2,7}$0$^{3,5}$]hendec-9-yl)-3-oxatricyclo(3.2.1.0$^{2,4}$)-oct-6-yl-ether;
(4-oxatetracyclo[6.2.1.0$^{2,7}$0$^{3,5}$]hendec-9-yl)-3,4-epoxy-2,5-endomethylene-cyclohexylmethyl)ether;
ethylene glycol-bis(4-oxatetracyclo[6.2.1.0$^{2,7}$0$^{3,5}$]hendec-9-yl)ether;
diethylene glycol-bis(4-oxatetracyclo[6.2.1.0$^{2,7}$0$^{3,5}$]hendec-9-yl)ether;
1,3-propylene glycol-bis(4-oxatetracyclo[6.2.1.0$^{2,7}$0$^{3,5}$]hendec-9-yl)ether;
glycerine-bis(4-oxatetracyclo(6.2.1.0$^{2,7}$0$^{3,5}$]hendec-9-yl)ether;
bis(4-oxatetracyclo[6.2.1.0$^{2,7}$0$^{3,5}$]hendec-9-yl)ether;
bis(4-oxatetracyclo[6.2.1.0.$^{2,7}$0$^{3,5}$]hendec-9-yl)formal;
bis(4-oxatetracyclo[6.2.1.0$^{2,7}$0$^{3,5}$]hendec-9-yl)succinate;
bis(4-oxatetracyclo[6.2.1.0$^{2,7}$0$^{3,5}$]hendec-9-yl)maleate;
bis(4-oxatetracyclo[6.2.1.0$^{2,7}$0$^{3,5}$]hendec-9-yl)phthalate;
bis(4-oxatetracyclo[6.2.1.0$^{2,7}$0$^{3,5}$]hendec-9-yl)adipate;
bis(4-oxatetracyclo[6.2.1.0$^{2,7}$0$^{3,5}$]hendec-9-yl)sebacate;
tris(4-oxatetracyclo[6.2.1.0$^{2,7}$0$^{3,5}$]hendec-9-yl) trimellitate;
9,10-epoxy-octadecane-acid[4-oxatetracyclo(6.2.1.0$^{2,7}$0$^{3,5}$) hendec-9-yl]ester; and
9,10,12,13-diepoxyoctadecane-acid-(4-oxatetracyclo [6.2.1.0$^{2,7}$0$^{3,5}$]hendec-9-yl)ester.

It is also possible to use mixtures of such cycloaliphatic epoxide resins.

The polyesters of Formula I used for the manufacture of the new curable mixtures according to the invention can be acid polyesters having two terminal carboxyl groups or having one terminal carboxyl group and one terminal hydroxyl group. They can also represent polyesters with two terminal hydroxyl groups. Such polyesters are obtained according to known methods by polycondensation of the dicarboxylic acids with the diols. Depending on the chosen molar ratio of dicarboxylic acid and diol and the completeness of the condensation, polyesters of various chain length and various end group distribution are obtained. At the same time the molar ratio and degree of condensation must be so chosen that the average molecular weight of the polyester lies in the range of about 1100 to about 8000.

The aliphatic-cycloaliphatic higher dicarboxylic acids which are suitable for the manufacture of the polyester can be obtained by dimerization of monomeric fatty acids having sufficiently functional double bonds or of fatty acids derived from drying or semi-drying oils.

Possible monomeric fatty acids of this kind are those containing 14 to 24 carbon atoms, preferably 16 to 18 carbon atoms, in the molecule and possessing at least one reactive double bond in the molecule, such as for example oleic acid, linoleic acid, linolenic acid, ricinoleic acid and also fatty acids containing hydroxyl groups such as for example castor oil acid.

As suitable semi-drying or drying oils from which such fatty acids are derived there may be mentioned: cottonseed oil, rape oil, safflower oil, sesame oil, sunflower oil, soya oil, tung oil, linseed oil, oiticica oil, perilla oil and the like.

In the known dimerization process for the manufacture of the aliphatic-cycloaliphatic dicarboxylic acids the fatty acids, which must contain at least one double bond in the molecule, mainly react to form an acid mixture which principally consists of dimeric consitituents and to a lesser extent also of trimeric or higher molecular constituents. The monomeric insufficiently functional acids are removed from the reaction mixture by distillation.

The aliphatic-cycloaliphatic dicarboxylic acids obtained by polymerization, which are unsaturated up to a certain degree, can, either directly or after subsequently effected hydrogenation, be used for the manufacture of the polyesters.

The following compounds are preferably used as aliphatic diols for the manufacture of the polyesters:

Ethylene glycol, 1,2- and 1,3-propanediol, 1,4-butanediol, 1,5-pentanediol, neopentyl glycol, 1,6-hexanediol, 1,7 - heptanediol, 1,8 - octanediol, 1,9-nonanediol, 1,10-decanediol, 1,11 - undecanediol, 1,12 - dodecanediol, 1,6-dihydroxy - 2,2,4 - trimethylhexane, and 1,6-dihydroxy-2,4,4-trimethylhexane.

It is also possible additionally to employ smaller proportions of trivalent or polyvalent components in the manufacture of the polyesters (I), such as for example hexanetriol or trimerized fatty acid, tricarboxylic or tetracarboxylic acid, such as trimeellitic acid anhydride or pyromellitic acid anhydride. The curable mixtures which contain polyester mixtures manufactured in this way as component (3), and which in addition to polyesters of Formula I also contain proportions of more strongly branched-chain polyesters having more than two terminal carboxyl groups, either yield moulded materials with analogous physical properties after curing, so that in most cases no further advantages arise thereby.

A molar ratio of dicarboxylic acid to diol greater than 1 is chosen for the manufacture of acid polyesters with predominantly terminal carboxy groups. If, conversely, the molar ratio of dicarboxylic acid to diol is chosen to be less than 1, polyesters are obtained which predominantly contain hydroxyls as end groups.

The acid polyesters used according to the invention preferably as a rule correspond to the formula

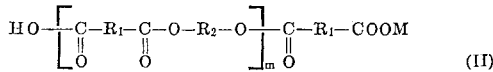

wherein $R_1$ denotes the hydrocarbon residue of an unsaturated or saturated aliphatic-cycloaliphatic higher decarboxylic acid which has been manufactured by dimerization of unsaturated monomeric fatty acids with 14 to 24 carbon atoms in the molecule, preferably 16 to 18 carbon atoms, and optionally subsequent hydrogenation of such a dimeric fatty acid, $R_2$ denotes a residue of an aliphatic diol obtained by removing the two hydroxyl groups and $m$ denotes an integer from 1 to 20, preferably from 2 to 6.

The polyesters with terminal hydroxyl groups, which can also be used in accordance with the invention, preferably as a rule correspond to the formula

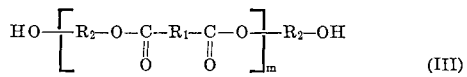

wherein the symbols $R_1$, $R_2$ and $m$ have the same significance as in Formula II.

It is however also possible to use polyesters with terminal carboxyl and/or hydroxyl groups which are manufactured by condensation of the dicarboxylic acid defined above with a mixture of two or more diols, or conversely by condensation of a diol with a mixture of two or more of the dicarboxylic acids defined above in the correct mutual stoichiometric quantity ratio. Of course, acid polyesters can also be manufactured by condensation of mixtures of different dicarboxylic acids with mixtures of different diols.

As the polycarboxylic acid anhydride (2), such curing agents are preferably used as yield cured moulded materials having a heat distortion point according to Martens DIN 53,458 of at least 90° C., and preferably at least 140° C., in the reaction with only the polyepoxide used as the starting substance for the manufacture of the heat-curable epoxide resin mixture (that is to say the unplasticized polyepoxide).

Such preferentially used curing agents are for example cycloaliphatic polycarboxylic acid anhydrides such as Δ⁴-tetrahydrophthalic anhydride, 4-methyl-Δ⁴-tetrahydrophthalic anhydride, hexahydrophthalic anhydride, 4-methyl-hexahydrophthalic anhydride, 3,6-endomethylene-Δ⁴-tetrahydrophthalic anhydride, 4-methyl-3,6-endomethylene-Δ⁴-tetrahydrophthalic anhydride (=methylnadicanhydride) and the Diels-Alder adducts of 2 mols of maleic anhydride and 1 mole of 1,4-bis(cyclopentadienyl)-2-butene, and also dodecenylsuccinic anhydride.

Accelerators such as tertiary amines, for example 2,4,6-tris(dimethylaminomethyl)phenol, or alkali metal alcoholates, for example sodium methylate or sodium hexylate, can optionally be conjointly used for the curing.

The term "curing" as used here denotes the conversion of the above mixtures into insoluble and infusible cross-linked products, and in particular, as a rule, with simultaneous shaping to give mouldings such as castings, pressings or laminates, or to give two-dimensional structures such as lacquer films or adhesive bonds.

The curable mixture according to the invention can be mixed with fillers and reinforcing agents, pigments, dyestuffs, flameproofing substances and mould release agents in any stage before curing.

Glass fibres, boron fibres, carbon fibres, mica, quartz powder, aluminium oxide trihydrate, gypsum, burnt kaolin or metal powders such as aluminium powder can for example be used as fillers and reinforcing agents.

The curable mixtures, in the unfilled or filled state, can especially serve as laminating resins, dipping resins, impregnating resins, casting resins or potting and insulating compositions for the electrical industry. They can further be successfully used for all other industrial fields where usual epoxy resins are employed, for example as binders, adhesives, paints, lacquers, compression moulding compositions and sintering powders.

In the examples which follow the percentages denote percentages by weight.

The following polyesters were used for the manufacture of the curable mixtures described in the examples:

(a) MANUFACTURE OF DIMERIZED FATTY ACIDS

Manufacture of dimerized dehydrated castor oil fatty acid 1000 g. of castor oil fatty acid (octadeca-9,11-diene-acid) were kept for 10 hours at 260° C. in an autoclave under nitrogen. The resulting brown-colored reaction mixture was subsequently distilled so that the unreacted castor oil fatty acid (boiling point 178–187° C./8 mm. Hg) could be recovered together with a slight first run. 293.5 g. of crude dimerized fatty acid (also containing a proportion of trimerized acid) were obtained as the residue.

Acid equivalent weight: 281.

Molecular weight: 562 (determined by recording the mass spectrum).

Manufacture of hydrogenated dimerized dehydrated castor oil fatty acid 144 g. of the dimerized castor oil fatty acid obtained above were hydrogenated with 10 g. of 10% strength palladium on charoal under 60 atmospheres hydrogen pressure at 60° C. until no further hydrogen absorption could be detected. The catalyst was then filtered off and the crude product was directly employed for the manufacture of the polyester.

(b) MANUFACTURE OF POLYESTERS

Manufacture of polyester A 130.5 g. of the hydrogenated dimerized castor oil fatty acid were mixed with 13.5 g. of butanediol-(1,4) (corresponding to a ratio of 4 equivalents of alcohol per 5 equivalents of dimerized fatty acid), and heated for 1¼ hours to 170° C. and for 4 hours to 200° C. After this time 5.3 g. of water had been split off. A brown-colored polyester of low viscosity was thereby obtained, having an acid equivalent weight of 1336 (determined by titration in tetrahydrofuran).

Manufacture of polyester B 1144 g. of a dibasic acid manufactured by dimerization of oleic acid, having an average of 36 carbon atoms and an acid equivalent weight of 286 (obtainable under registered trade name Empol 1014) were warmed to 152° C., under a nitrogen atmosphere, with 157 g. of hexanediol-(1,6) [corresponding to a ratio of 2 equivalents of alcohol per 3 equivalents of dimerized fatty acid], in the course of which the water produced by the polycondensation was continuously distilled off. The last remnants of water were removed by a vacuum treatment at 20 to 12 mm. Hg and 218° C. The reaction product was a light yellow viscous liquid having an acid equivalent weight of 909 (theory 990).

Manufacture of polyester C 1132 g. of a dibasic acid manufactured by dimerization of oleic acid, having an average of 36 carbon atoms and an acid equivalent weight of 283 (obtainable under registered trade name Empol 1014) were warmed to 148° C. under a nitrogen atmosphere with 189 g. of hexanediol-(1,6) (corresponding to a ratio of 4 equivalents of hexanediol per 5 equivalents of the dimerized fatty acid). The mixture was warmed to 198° C. over the course of 7 hours while stirring and the water produced by the polycondensation was continuously distilled off. The last remnants of the water of condensation were removed by vacuum treatment at 20 to 10 mm. Hg and 197° C. over the course of 1 hour. The reaction product was a light yellow viscous liquid having an acid equivalent weight of 1575 (theory 1594).

Manufacture of polyester D 2544 g. of dimerized fatty acid Empol 1014, which was used in the manufacture of polyester B, were warmed to 150° C. with 394 g. of hexanediol-(1,6) [corresponding to a ratio of 4 mols of hexanediol per 3 mols of dimerized fatty acid] and further warmed to 140° C. over the course of 5 hours while stirring in a nitrogen atmosphere. Thereafter a vacuum of 12 mm. Hg was applied over the course of 1 hour. The reaction product was a light yellow liquid with a predominant proportion of hydroxyl groups.

Manufacture of polyester E 3008 g. of dimerized fatty acid (Empol 1014), used in the manufacture of polyester B, were warmed to 141° C. under a nitrogen atmosphere with 244 g. of ethylene glycol (corresponding to a ratio of 3 equivalents of glycol per 4 equivalents of dimerized fatty acid). The mixture was further warmed to 188° C. over the course of 6 hours while stirring and the resulting water was continuously distilled off. After a vacuum treatment of 70 minutes at 188° C. a viscous liquid which was light yellow at room temperature and had an acid equivalent weight of 935 (theory 1432) was obtained.

Manufacture of polyester F 1145 g. of dimerized fatty acid (Empol 1014) having an acid equivalent weight of 286 were warmed to 138° C. under a nitrogen atmosphere with 156 g. of neopentyl glycol (corresponding to a ratio of 4 equivalents of dimeric fatty acid per 3 equivalents of neopentyl glycol). The mixture was further warmed to 188° C. over the course of 6 hours while stirring. Thereafter the reaction poduct was cooled to 132° C., subjected to a vacuum of 12 mm. Hg, and warmed to 178° C. over the course of 1¼ hours. The acid polyester thus obtained was a viscous yellow liquid having an acid equivalent weight of 1210 (theory 1246).

Manufacture of polyester G 1716 g. of dimerized fatty acid (Empol 1014) were warmed to 141° C. with 265 g. of diethylene glycol (corresponding to 5 equivalents of hydroxyl per 6 equivalents of carboxyl) in a nitrogen atmosphere. The mixture was further warmed to 200° C. over the course of 4 hours while stirring and the water which formed was distilled off. The mixture was cooled to 105° C. and a vacuum of 12 mm. Hg was applied. The mixture was warmed to 200° C. over the course of 2½ hours in vacuo. The viscous light yellow polyester had an acid equivalent weight of 1602 (theory 1888).

Manufacture of polyester H 381 g. of a polycarboxylic acid manufactured by dimerization of oleic acid, having an acid equivalent weight of 295 (containing 75% of dimerized and 24% of trimerized acid, regstered trade name Empol 1024) were warmed to 160° C. under a nitrogen atmosphere with 50.8 g. of hexanediol-(1,6) [corresponding to a ratio of 3 equivalents of fatty acid per 2 equivalents of hexanediol]. The mixture was further warmed to 170° C. over the course of 6 hours while stirring, with the water produced by polycondensation being continuously distilled off. Thereafter the mixture was subjected to a vacuum for 40 minutes at 173° C. and 14 mm. Hg. The resulting polyester was a light yellow liquid which was viscous at room temperature and had an acid equivalent weight of 905 (theory 968).

Manufacture of polyester I 516.6 g. (0.9 mol) of dimerized fatty acid (Empol 1014) having an acid equivalent weight of 286 were mixed with 54.7 g. (0.85 mol+3.8% excess) of ethylene glycol (corresponding to a ratio of dicarboxylic acid:glycol=18:17)

and heated to 160° C. for 56 hours, and the water produced by the polycondensation was continuously distilled off. For the last 3 hours of this total reaction time the mixture was allowed to complete reacting under a waterpump vacuum. A light brown viscous polyester having an acid equivalent weight of 5375 (theory 5387) was obtained.

Manufacture of polyester J 516.6 g. (0.9 mol) of dimerized fatty acid (Empol 1014) having an acid equivalent weight of 286 were mixed with 51.1 g. (0.8 mol+3% excess) of ethylene glycol (corresponding to a ratio of dicarboxylic acid:glycol=9:8) and heated to 160° C. for 56 hours. After this reaction time the splitting off of water of the polycondensation was complete. A light yellow viscous polyester resulted, having an acid equivalent weight of 2563 (theory 2687).

PROCESSING EXAMPLES

Example 1

50 g. of the cycloaliphatic diepoxide compound of formula

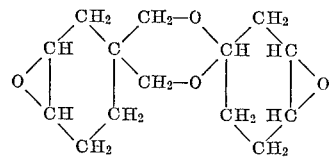

(=3',4'-epoxyhexahydrobenzal - 3,4 - epoxycyclohexane-1,1-dimethanol) which is liquid at room temperature and has an epoxide content of 6.2 epoxide equivalents per kg. (=epoxide resin I) were warmed to 100° C. with 50 g. of polyester A and 42 g. of hexahydrophthalic anhydride (corresponding to 0.12 equivalent of acid polyester and 0.88 equivalent of anhydride per 1.0 equivalent of epoxide compound) as well as with 0.5 g. of triamylammonium phenolate, well mixed and subjected to a brief vacuum treatment to remove the air bubbles, and poured into aluminium moulds which were prewarmed to 100° C. and treated with a silicone release agent, with sheets of size 135 x 135 x 4 mm. being manufactured for the determination of the flexural strength, deflection, impact strength and water absorption, and the same sheets but with a thickness of 3 mm. being manufactured for the measurement of the loss factor. The test specimens for the flexural test and impact test were machined from the sheets, while for the tensile test (Examples 2 and subsequent examples) the appropriate test specimen according to DIN 16,946, or DIN 53,455, sample shape 2 (4 mm.) or VSM 77,101, FIG. 2 (4 mm. thick sample rod) were manufactured directly. After a heat treatment of 16 hours at 140° C. the following properties were measured on the mouldings:

Flexural strength according to VSM 77,103=4.6 kg./mm.²
Deflection according to VSM 77,103=>16 mm.
Impact strength according to VSM 77,105=17 cm. kg./mm.²
Dielectric loss factor tg δ (50 Hz.)—
  At 20° C.=0.008
  At 60° C.=0.009
  At 100° C.=0.011
  At 140° C.=0.028

Modulus of shear G according to DIN 53,445—
  At −40° C.=8.9×10⁹ dyne/cm.²
  At +20° C.=4.4×10⁹ dyne/cm.²

At +60° C.=2.6×10⁹ dyne/cm.²
At +138° C.=1.2×10⁹ dyne/cm.²

Example 2

(a) 100 g. of the diepoxide compound of formula

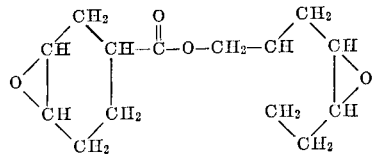

(3′,4′ - epoxycyclohexylmethyl-3,4-epoxycyclohexanecarboxylate) which is liquid at room temperature and has an epoxide content of 7.1 epoxide equivalents/kg. (=epoxide resin II) were warmed to 80° C. with 100 g. of polyester B and 46.2 g. of hexahydrophthalic anhydride. After addition of 3 g. of a 6% strength solution of the sodium alcoholate of 3-hydroxymethyl-2,4-dihydroxypentane (subsequently described as "sodium hexylate" for brevity) in 3-hydroxymethyl-2,4-dihydroxypentane (subsequently described as "hexanetriol" for brevity) the mixture was well mixed and after removal of the air bubbles by a short vacuum treatment it was poured into the prewarmed moulds according to Example 1. After a heat treatment of 16 hours at 140° C. mouldings with the following properties were obtained:

Tensile strength according to VSM 77,101=5.6 kg./mm.²
Elongation at break according to VSM 77,101=8%
Water absorption after 24 hours storage in water at 20° C.=0.17%
Dielectric loss factor tg δ (50 Hz.)—

At 20° C.=0.021
At 60° C.=0.024
At 100° C.=0.029
At 120° C.=0.037

(b) If 417 g. of epoxide resin II, 909 g. of polyester B and 309 g. hexahydrophthalic anhydride (corresponding to 3.0:1.0:2.0 equivalents) as well as 200 g. of the same accelerator and the same processing and cure as in Example 2(a) were used, mouldings having the following properties were obtained:

Tensile strength according to VSM 77,101=1.06 kg./mm.²
Elongation at break according to VSM 77,101=39%
Tensile strength according to ISO 468 [1] at 20° C.=0.79 kg./mm.²
Elongation at break according to ISO at 20° C.=50%
Tensile strength according to ISO at 66° C.=0.32 kg./mm.²
Elongation at break according to ISO at 66° C.=48%

Example 3

(a) 403 g. of epoxide resin I were warmed to 90° C. with 909 g. of polyester B and 231 g. of hexahydrophthalic anhydride (corresponding to 2.5:1.0:1.5 equivalents). After adding 15 g. of a 6% strength solution of "sodium hexylate" in "hexanetriol" the mixture was well mixed and deaerated. The mixture had a viscosity of 250 cp. at 90° C. It was poured into the prewarmed moulds according to Example 1 and subjected to a heat treatment of 16 hours at 140° C. The following properties were measured on the mouldings:

Tensile strength according to VSM 77,101=1.04 kg./mm.²
Elongation at break according to VSM 77,101=52%
Tensile strength according to ISO 468 [1] at 20° C.=0.78 kg./mm.²

Elongation at break according to ISO 468 at 20° C.=60%
Tensile strength according to ISO at 66° C.=0.32%
Elongation at break according to ISO at 66° C.=50%

The tensile strength at 66° C. is surprisingly high for mouldings which are very flexible and extensible at room temperature, and shows the great advantage of the mixtures according to the invention.

(b) If 1.3 equivalents of anhydride were used instead of 1.5 equivalents, 10 g. of 2-methyl-4-ethyl-imidazole were used as the accelerator, and otherwise the same composition and processing as in Example 3(a) was used, the following results were measured:

Tensile strength according to VSM 77,101=1.34 kg./mm.²
Elongation at break according to VSM 77,101=84%

Example 4

100 g. of epoxide resin I were warmed to 100° C. with 100 g. of polyester C and 76.3 g. of hexahydrophthalic anhydride (equivalent ratio=0.62:0.063:0.495), and after addition of 1 g. of triamylammonium phenolate the composition was well mixed and deaerated. The mixture was poured into the prewarmed moulds according to Example 1 and subjected to a heat treatment of 16 hours at 140° C. The following properties were measured on the mouldings thus obtained:

Limiting flexural stress, VSM 77,103=1.2 kg./mm.²
Deflection, VSM 77,103=>20 mm.
Impact strength, VSM 77,105=>23 cm. kg./cm.²
Tensile strength, VSM 77,101=1.50 kg./mm.²
Elongation at break, VSM 77,101=14%
Water absorption after 24 hours at 20° C.=0.24%
Dielectric loss factor tg δ (50 Hz.)—

At 20° C.=0.008
At 60° C.=0.010
At 100° C.=0.07

Example 5

100 g. of epoxide resin I were warmed to 100° C. with 100 g. of polyester D and 95.5 g. of hexahydrophthalic anhydride (corresponding to 1.0 equivalent of anhydride per 1.0 equivalent of epoxide compound) and after addition of 3 g. of a 6% strength solution of "sodium hexylate" in "hexanetriol" the composition was well mixed and deaerated. The mixture was poured into the prewarmed moulds according to Example 1 and subjected to a heat treatment of 16 hours at 140° C. The mouldings had the following properties:

Tensile strength according to VSM 77,101=1.2 kg./mm.²
Elongation at break according to VSM 77,101=17%
Water absorption after 24 hours at 20° C.=0.22%
Dielectric loss factor tg δ (50 Hz.)—

At 20° C.=0.008
At 60° C.=0.007
At 100° C.=0.015
At 130° C.=0.06

Example 6

100 g. of polyester F were warmed to 100° C. with 100 g. of epoxide resin I and well mixed with 83 g. of hexahydrophthalic anhydride and 1 g. of a 6% strength solution of "sodium hexylate" in "hexanetriol" and deaerated. The mixture was poured into the prewarmed moulds according to Example 1 and subjected to a heat treatment of 16 hours at 140° C. The mouldings had the following properties:

Limiting flexural stress according to VSM 77,103=2.2 kg./mm.²
Deflection according to VSM 77,103=>18 mm.
Impact strength according to VSM 77,105=>23 cm. kg./cm.²
Tensile strength according to VSM 77,101=2.1 kg./mm.²
Elongation at break according to VSM 77,101=11%

---

[1] The test specimens according to ISO 468, test specimen shape No. 1, were punched out of a 1 mm. thick sheet.

Water absorption after 24 hours at 20° C.=0.16%
Dielectric loss factor tg δ (50 Hz.)—
  At 20° C.=0.008
  At 100° C.=0.008
  At 140° C.=0.018

Example 7

100 g. of epoxide resin I were warmed to 100° C. with 150 g. of polyester G and 93.6 g. of methylnadicanhydride (equivalent ratio=0.62:0.0935:0.5265), well mixed with 2 g. of a 6% strength solution of "sodium hexylate" in "hexanetriol" and deaerated. The mixture was poured into the prewarmed moulds according to Example 1 and subjected to a heat treatment of 16 hours at 140° C. The mouldings had the following properties:

Limiting flexural stress according to VSM 77,103=1.0 kg./mm.$^2$
Deflection according to VSM 77,103=>20 mm.
Impact strength according to VSM 77,105=>25 cm. kg./cm.$^2$
Tensile strength according to VSM 77,101=3.3 kg./mm.$^2$
Elongation at break according to VSM 77,101=9%
Water absorption after 24 hours at 20° C.=0.13%
Dielectric loss factor tg δ (50 Hz.)—
  At 20° C.=0.007
  At 60° C.=0.008
  At 100° C.=0.02

Example 8

100 g. of epoxide resin II were warmed to 80° C. with 100 g. of polyester H, 106.8 g. of methylnadicanhydride and 2 g. of a 6% strength solution of "sodium hexylate" in "hexanetriol," well mixed, deaerated and poured into prewarmed moulds according to Example 1. After a heat treatment of 16 hours at 140° C. the following properties were measured on the mouldings:

Limiting flexural stress according to VSM 77,103=4.1 kg./mm.$^2$
Deflection according to VSM 77,103=20 mm.
Impact strength according to VSM 77,105=20 cm. kg./cm.$^2$
Tensile strength according to VSM 77,101=3.3 kg./mm.$^2$
Elongation at break according to VSM 77,101=9%
Water absorption after 24 hours at 20° C.=0.13%
Dielectric loss factor tg δ (50 Hz.)—
  At 20° C.=0.009
  At 60° C.=0.009
  At 100° C.=0.014

Example 9

(a) 100 g. of polyester I (=0.037 equivalent) were warmed to 120° C. with 100 g. of epoxide resin II (=0.71 equivalent), 179 g. of dodecenylsuccinic anhydride (=0.71 mol) and 2 g. of a 6% strength solution of "sodium hexylate" in "hexanetriol" and after a short vacuum treatment the mixture was poured into the moulds according to Example 1. After a heat treatment of 16 hours at 140° C. mouldings with the following properties were obtained:

Flexural strength according to VSM 77,103=3.3 kg./mm.$^2$
Deflection according to VSM 77,103=>20 mm.
Impact strength according to VSM 77,105=>25 cm. kg./cm.$^2$
Tensile strength according to VSM 77,101=2.3 kg./mm.$^2$
Elongation at break according to VSM 77,101=8%
Water absorption after 24 hours at 20° C.=0.15%

(b) When using 0.355 mol of dodecenylsuccinic anhydride and 0.355 mol (=56.2 g.) of methylnadicanhydride instead of 0.71 mol of dodecenylsuccinic anhydride and otherwise the same composition and processing as in Example 9(a), mouldings having the following properties were obtained:

Flexural strength according to VSM 77,103=2.3 kg./mm.$^2$
Deflection according to VSM 77,103=12 mm.
Impact strength according to VSM 77,105=>25 cm. kg./cm.$^2$
Tensile strength according to VSM 77,101=1.7 kg./mm.$^2$
Elongation at break according to VSM 77,101=8%
Water absorption after 24 hours at 20° C.=0.19%

Example 10

(a) 100 g. of polyester J (=0.078 equivalent) were warmed to 120° C. with 100 g. of epoxide resin II (=0.71 equivalent) and 168 g. of dodecenylsuccinic anhydride (=0.632 mol) and 2 g. of a 6% strength solution of "sodium hexylate" in "hexanetriol," well mixed, and after a short vacuum treatment poured into the moulds according to Example 1. After a heat treatment of 16 hours at 140° C. mouldings with the following properties were obtained:

Flexural strength according to VSM 77,103=3.0 kg./mm.$^2$
Deflection according to VSM 77,103=>20 mm.
Impact strength according to VSM 77,105=>25 cm. kg./cm.$^2$
Tensile strength according to VSM 77,101=2.3 kg./mm.$^2$
Elongation at break according to VSM 77,101=10%
Water absorption after 24 hours at 20° C.=0.15%
Dielectric loss factor tg δ (50 Hz.)—
  At 20° C.=0.007
  At 80° C.=0.009
  At 115° C.=0.017
  At 160° C.=0.017

(b) When using 0.316 mol of dodecenylsuccinic anhydride and 0.316 mol (=56.2 g.) of methylnadicanhydride instead of 0.632 mol of dodecenylsuccinic anhydride, and otherwise the same composition and processing as in Example 10(a), mouldings with the following properties were obtained:

Flexural strength according to VSM 77,103=1.8 kg./mm.$^2$
Deflection according to VSM 77,103=15 mm.
Impact strength according to VSM 77,105=>25 cm. kg./cm.$^2$
Tensile strength according to VSM 77,101=1.4 kg./mm.$^2$
Elongation at break according to VSM 77,101=8%
Water absorption after 24 hours at 20° C.=0.21%
Dielectric loss factor tg δ (50 Hz.)—
  At 20° C.=0.007
  At 80° C.=0.009
  At 115° C.=0.012
  At 140° C.=0.008

The dielectric losses at higher temperatures are unusually low for flexible mouldings of cured epoxide resins.

What is claimed is:
1. A heat-curable composition of matter comprising (1) a cycloaliphatic polyepoxide which possesses at least one 1,2-epoxide group located on a carbocyclic five-membered or six-membered ring, (2) a polycarboxylic acid anhydride in an amount of 0.2 to 1.1 equivalent of anhydride groups per 1 equivalent of epoxide group of the polyepoxide (1), and (3) a long-chain polyester of formula

$$X_1-A-X_2$$ 

in an amount of 0.02 to 0.4 mol per 1 equivalent of epoxide group of the polyepoxide (1), the symbols $X_1$ and $X_2$ in the formula each repersenting a carboxyl group or a hydroxyl group, and the symbol A representing the residue of the polyester, said polyester having been obtained by polycondensation of a member selected from the group consisting of unsaturated aliphatic-cycloaliphatic dicarboxylic acid which has been manufactured by dimerization of unsaturated monomeric fatty acid having 14 to 24 carbon atoms in the molecule, and saturated aliphatic-cycloaliphatic higher dicarboxylic acid which has been manufactured by dimerization of unsaturated monomeric fatty acid having 14 to 24 carbon atoms in the molecule, and subsequent hydrogenation of such a dimeric fatty acid, with an aliphatic branched-chain or straight-chain diol, with the proviso that the average molecular weight of the said polyester lies between about 1100 and about 8000.

2. A heat-curable composition of matter comprising (1) a cycloaliphatic polyepoxide which possesses at least one 1,2-epoxide group located on a carbocyclic five-membered or six-membered ring, (2) a polycarboxylic acid anhydride in an amount of 0.2 to 1.1 equivalent of anhydride groups per 1 equivalent of epoxide group of the polyepoxide (1), and (3) a long-chain polyester of formula

$X_1-A-X_2$ in an amount of 0.03 to 0.2 mol per 1 equivalent of epoxide group of the polyepoxide (1), the symbols $X_1$ and $X_2$ in the formula each representing a carboxyl group or a hydroxyl group, and the symbol A representing the residue of the polyester, said polyester having been obtained by polycondensation of a member selected from the group consisting of unsaturated aliphatic-cycloaliphatic dicarboxylic acid which has been manufactured by dimerization of unsaturated monomeric fatty acid having 14 to 24 carbon atoms in the molecule, and saturated aliphatic-cycloaliphatic higher dicarboxylic acid which has been manufactured by dimerization of unsaturated monomeric fatty acid having 14 to 24 carbon atoms in the molecule, and subsequent hydrogenation of such a dimeric fatty acid, with an aliphatic branched-chain or straight-chain diol, with the proviso that the average molecular weight of the said polyester lies between about 1100 and about 8000.

3. A heat-curable composition of matter comprising (1) a cycloaliphatic polyepoxide which possesses at least one 1,2-epoxide group located on a carbocyclic five-membered or six-membered ring, (2) a polycarboxylic acid anhydride in an amount of 0.2 to 1.1 equivalent of anhydride groups per 1 equivalent of epoxide group of the polyepoxide (1), and (3) a long chain polyester of formula

$X_1-A-X_2$ in an amount of 0.02 to 0.4 mol per 1 equivalent of epoxide group of the polyepoxide (1), the symbols $X_1$ and $X_2$ in the formula each representing a carboxyl group or a hydroxyl group, and the symbol A representing the residue of the polyester, said polyester having been obtained by polycondensation of a member selected from the group consisting of unsaturated aliphatic-cycloaliphatic dicarboxylic acid which has been manufactured by dimerization of unsaturated monomeric fatty acid having 16 to 18 carbon atoms in the molecule, and saturated aliphatic - cycloaliphatic higher dicarboxylic acid which has been manufactured by dimerization of unsaturated monomeric fatty acid having 16 to 18 carbon atoms in the molecule, and subsequent hydrogenation of such a dimeric fatty acid, with an aliphatic branched-chain or straight-chain diol, with the proviso that the average molecular weight of the said polyester lies between about 1100 and about 8000.

4. A composition as claimed in claim 1, which contains a cycloaliphatic polyepoxide which on curing with carbocyclic carboxylic acid anhydride alone yields a cured moulded material having a heat distortion point according to Martens DIN of at least 90° C.

5. A composition as claimed in claim 4, which contains a cycloaliphatic polyepoxide compound which on curing with carbocyclic carboxylic acid anhydrides alone yields a cured moulded material having a heat distortion point according to Martens DIN of at least 140° C.

6. A composition as claimed in claim 1 which contains a diepoxide of the formula

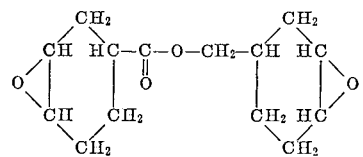

or

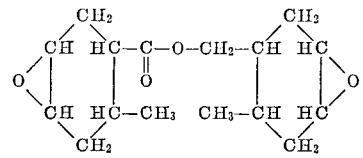

as the polyepoxide (1).

7. A composition as claimed in claim 1 which contains a diepoxide of formula

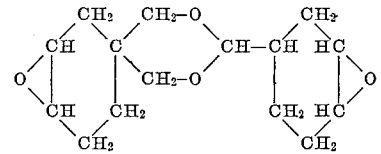

as the polyepoxide (1).

8. A composition as claimed in claim 1 which contains a polyester which is obtained by reaction of dimerized fatty acid with aliphatic diol.

9. A composition as claimed in claim 8 which contains a polyester derived from dimerized dehydrated castor oil fatty acid as the dimerized fatty acid.

10. A composition as claimed in claim 8 which contains a polyester derived from dimerized oleic acid as the dimerized fatty 11. A composition as claimed in claim 8 which contains a polyester derived from ethylene glycol as the diol.

12. A composition as claimed in claim 8 which contains a polyester derived from propylene glycol-(1,3), butanediol-(1,4) or hexanediol-(1,6) as the diol.

13. A composition as claimed in claim 8 which contains a polyester derived from propylene glycol-(1,2) or neopentyl glycol as the diol.

14. A composition as claimed in claim 1 which contains an acid polyester of formula

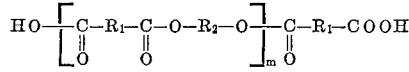

wherein $R_1$ denotes the hydrocarbon residue of a member of the group consisting of unsaturated aliphatic-cycloaliphatic dicarboxylic acid which has been manufactured by dimerization of unsaturated monomeric fatty acids having 14 to 24 carbon atoms in the molecule, and saturated aliphatic-cycloaliphatic dicarboxylic acid which has been manufactured by dimerization of unsaturated monomeric fatty acid having 14 to 24 carbon atoms in the molecule, and subsequent hydrogenation of such a dimeric fatty acid, and wherein $R_2$ denotes the residue of an aliphatic diol, and $m$ denotes an integer from 1 to 20.

15. A composition as claimed in claim 1 which contains an acid polyester of formula

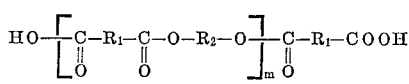

wherein $R_1$ denotes the hydrocarbon residue of a member of the group consisting of unsaturated aliphatic-cycloaliphatic dicarboxylic acid which has been manufactured by dimerization of unsaturated monomeric fatty acids having 16 to 18 carbon atoms in the molecule, and saturated aliphatic-cycloaliphatic dicarboxylic acid which has been manufactured by dimerization of unsaturated monomeric fatty acid having 16 to 18 carbon atoms in the molecule and subsequent hydrogenation of such a dimeric fatty acid, and wherein $R_2$ denotes the residue of an aliphatic diol, and $m$ denotes an integer from 1 to 20.

16. A composition as claimed in claim 1 which contains a polyester with hydroxyl groups of formula

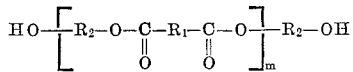

wherein $R_1$ denotes the hydrocarbon residue of a member of the group consisting of unsaturated aliphatic cycloaliphatic dicarboxylic acid which has been manufactured by dimerization of unsaturated monomeric fatty acids having 14 to 24 carbon atoms in the molecule, and saturated aliphatic-cycloaliphatic dicarboxylic acid which has been manufactured by dimerization of unsaturated monomeric fatty acid having 14 to 24 carbon atoms in the molecule, and subsequent hydrogenation of such a dimeric fatty acid, $R_2$ denotes the residue of an aliphatic diol, and $m$ denotes an integer from 1 to 20.

17. A composition as claimed in claim 1 which contains a cycloaliphatic polycarboxylic acid anhydride.

References Cited

UNITED STATES PATENTS

| | | | |
|---|---|---|---|
| 3,031,434 | 4/1962 | Radlove | 260—78.4 |
| 3,036,023 | 5/1962 | Rodgers et al. | 260—2.5 |
| 3,098,052 | 7/1963 | Schmitz et al. | 260—22 |
| 3,278,636 | 10/1966 | Wynstra | 260—835 |
| 3,390,108 | 6/1968 | Keck et al. | 260—75 |
| 3,468,704 | 9/1969 | Graver | 260—22 |

FOREIGN PATENTS

| | | | |
|---|---|---|---|
| 441,752 | 1/1968 | Switzerland | 260—75 |

HOSEA E. TAYLOR, Primary Examiner

R. W. GRIFFIN, Assistant Examiner

U.S. Cl. X.R.

117—161; 260—40